United States Patent
Chen (10) Patent No.: US 12,528,115 B2
(45) Date of Patent: Jan. 20, 2026

(54) INSTALLATION TOOL FOR SELF-TAPPING RIVET FASTENER

(71) Applicant: Wei-Chih Chen, Taichung (TW)

(72) Inventor: Wei-Chih Chen, Taichung (TW)

(*) Notice: Subject to any disclaimer, the term of this patent is extended or adjusted under 35 U.S.C. 154(b) by 344 days.

(21) Appl. No.: 18/375,526

(22) Filed: Oct. 1, 2023

(65) Prior Publication Data
US 2025/0108430 A1    Apr. 3, 2025

(51) Int. Cl.
*B21J 15/10* (2006.01)
*F16B 19/08* (2006.01)

(52) U.S. Cl.
CPC ........... *B21J 15/105* (2013.01); *F16B 19/083* (2013.01)

(58) Field of Classification Search
CPC ........ B21J 15/105; B21J 15/26; F16B 19/083; B25B 23/0035; Y10T 29/5343; Y10T 29/49833; Y10T 29/49943; Y10T 408/95; Y10T 29/5373
See application file for complete search history.

(56) References Cited

U.S. PATENT DOCUMENTS 3,412,594 A * 11/1968 Lund ...................... B21J 15/048
                                                              408/239 R
4,920,833 A *  5/1990 Rosenthal ........... F16B 19/1072
                                                                  411/40

FOREIGN PATENT DOCUMENTS

AU        2009201415 A1    10/2009

* cited by examiner

*Primary Examiner* — Jason L Vaughan
*Assistant Examiner* — Amanda Kreiling
(74) *Attorney, Agent, or Firm* — LANWAY IPR SERVICES; Chun-Ming Shih (57) ABSTRACT

An installation tool for a self-tapping rivet fastener contains: a body, a movable sleeve, a handle, a single-direction thrust bearing, a switcher, a drive rod, a transmission shaft, a cap, a locking element, and a screw nut. The body includes multiple ribs, two protrusions, two slots, a circular orifice, a stepped fringe, a positioning orifice, a threaded section, and a connection groove. The movable sleeve moves on the body. The handle includes a hollowly circular fitting portion. The switcher includes a coupling portion, a connection flange, a defining hole, and a fitting hole. The drive rod includes a shank, a positioning fringe, and a fixing portion. The transmission shaft includes a threaded orifice, a connecting portion, and a shoulder. The cap is hollow. The locking element includes a threaded extension, a driving portion, and a threaded aperture. The screw nut includes a screwing section and a receiving orifice.

6 Claims, 7 Drawing Sheets

INSTALLATION TOOL FOR SELF-TAPPING RIVET FASTENER

TECHNICAL FIELD

The present disclosure relates to an installation tool for a self-tapping rivet fastener which is capable of drilling a hole and riveting a nut of the workpiece.

BACKGROUND

A conventional electric riveting tool is applied to connect, rivet, and fasten two workpieces (such as two plates). A conventional manual riveting tool is used to drill a hole between the two plates, then a fastener is received in the hole, and the riveting tool pulls a central rod of the fastener toward a user, thus deformably riveting the two plates together. Thus, the central rod of the fastener is pulled by a pull grip of the riveting tool to press a riveting sleeve to deform and fasten.

A conventional self-tapping riveting fastener is disclosed in AU 2009201415A1 and is applied to drill a hole and rivet a workpiece, thus reducing an operation of drilling a hole efficiently.

However, the riveting tool is classified to a pneumatic driven type and an electric driven type, so an air compressor is required, and it is not suitable for outdoor construction situations or general DIY users. In addition, the pneumatic and electric driven riveting tool cannot be used to drill a hole, therefore drilling the hole on the workpiece in advance is required, and then the fastener is driven by the riveting tool to fasten the workpiece, thus causing troublesome operation.

The present invention has arisen to mitigate and/or obviate the afore-described disadvantages.

SUMMARY

A primary aspect of the present invention is to provide an installation tool for a self-tapping rivet fastener which is capable of drilling a hole and riveting a nut of the workpiece.

To obtain above-mentioned aspect, an installation tool for a self-tapping rivet fastener provided by the present invention contains: a body, a movable sleeve, a handle, a single-direction thrust bearing, a switcher, a drive rod, a transmission shaft, a cap, a locking element, and a screw nut.

The body includes the movable sleeve on which the handle is fixed. The body also includes the switcher received therein and having the drive rod and the transmission shaft which are accommodated on the switcher and screwed with each other. The locking element is mounted on the outer wall of the transmission shaft and is configured to replace corresponding to different central rods of the riveting fasteners. The body also includes two slots for accommodating two slide blocks. The respective one slide block has a notch connected with the switcher. The movable sleeve and the two slide blocks actuate the switcher to move axially, and the body includes the positioning orifice corresponding to the coupling portion of the switcher.

When the movable sleeve is pulled toward the user, the coupling portion of the switcher is driven to remove from the positioning orifice of the body so that and the switcher and the transmission shaft are driven by the drive rod simultaneously to rotate, thus drilling the drilled hole of the workpiece.

When the movable is pulled to move away from the user, the coupling portion of the switcher is driven to connect with the positioning orifice of the body so that the switcher and the transmission shaft do not rotate with the drive rod, and the drive rod actuates the transmission shaft and the locking element to be pulled to the user with the locking element, thus riveting the workpiece. Thereby, the installation tool of the present invention is capable of drilling and riveting the workpiece.

Preferably, the positioning orifice of the body is formed in a hexagon shape to correspond to the coupling portion of the switcher which is hexagonal.

Preferably, the defining hole of the switcher is hexagonal to correspond to the fixing portion of the drive rod which is hexagonal.

Preferably, the defining hole of the switcher is hexagonal to correspond to the connecting portion of the transmission shaft which is hexagonal.

Preferably, the shank of the drive rod is hexagonal.

Preferably, the driving portion of the locking element is hexagonal.

Other objects and features will be in part apparent and in part pointed out hereinafter.

DETAILED DESCRIPTION

Figure 1:
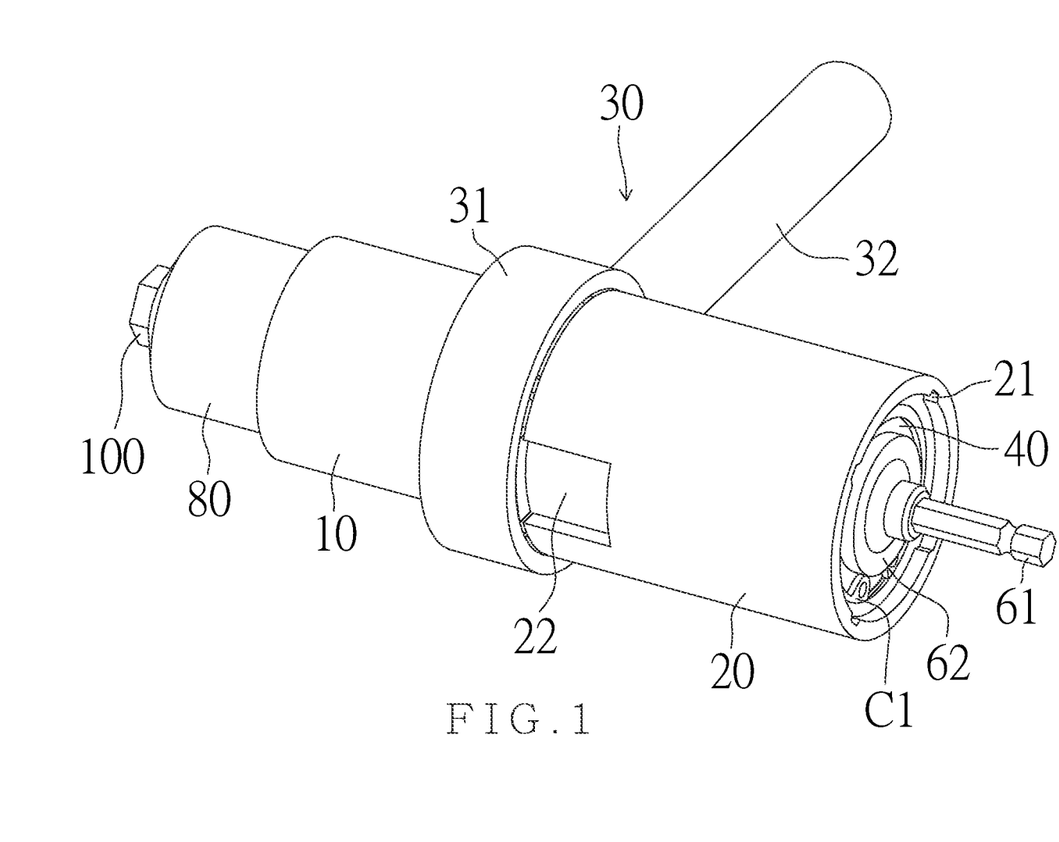
FIG. 1 is a perspective view showing the assembly of an installation tool for a self-tapping rivet fastener according to a preferred embodiment of the present invention.
Figure 2:
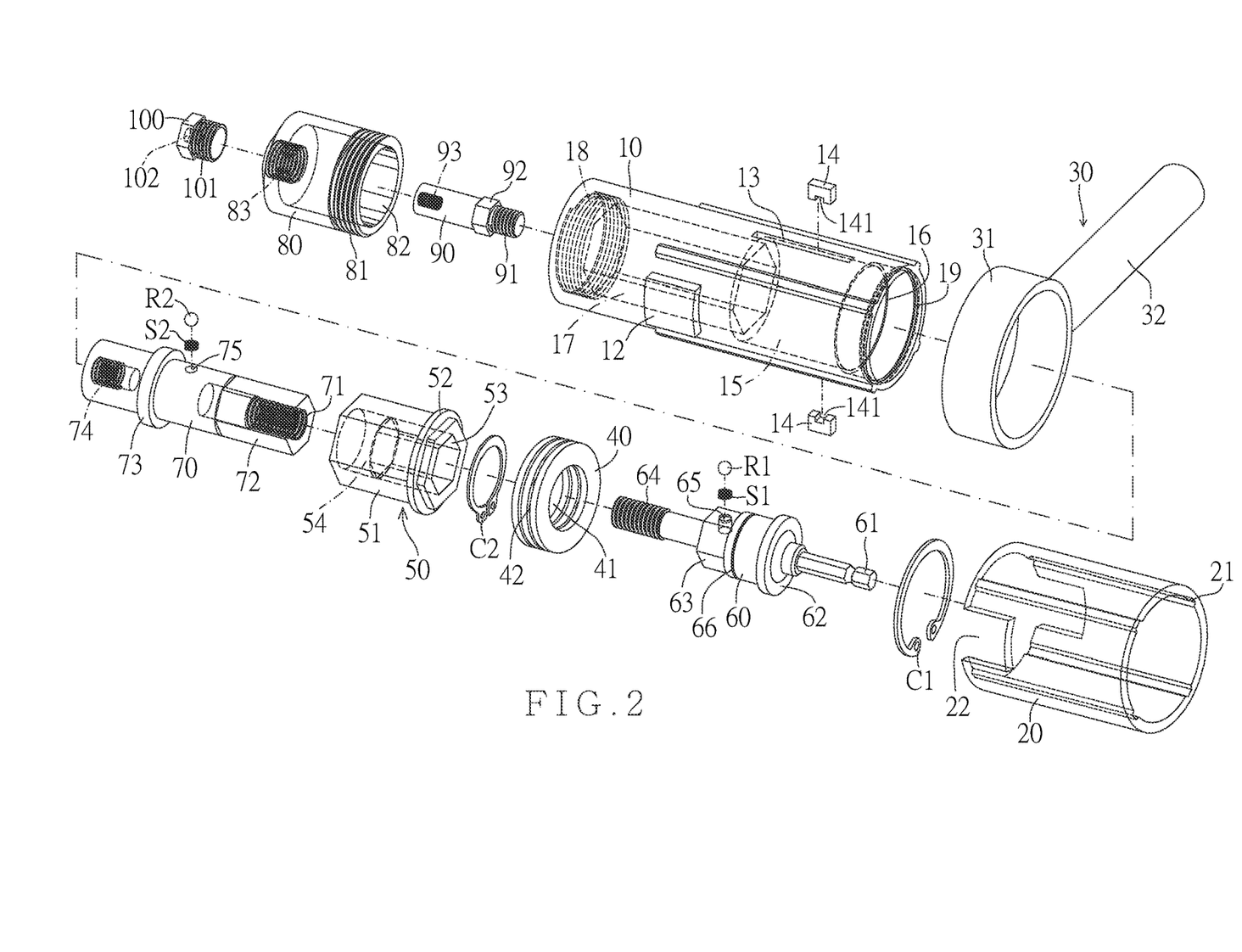
FIG. 2 is a perspective view showing the exploded components of the installation tool for the self-tapping rivet fastener according to the preferred embodiment of the present invention.
Figures 3, 4:
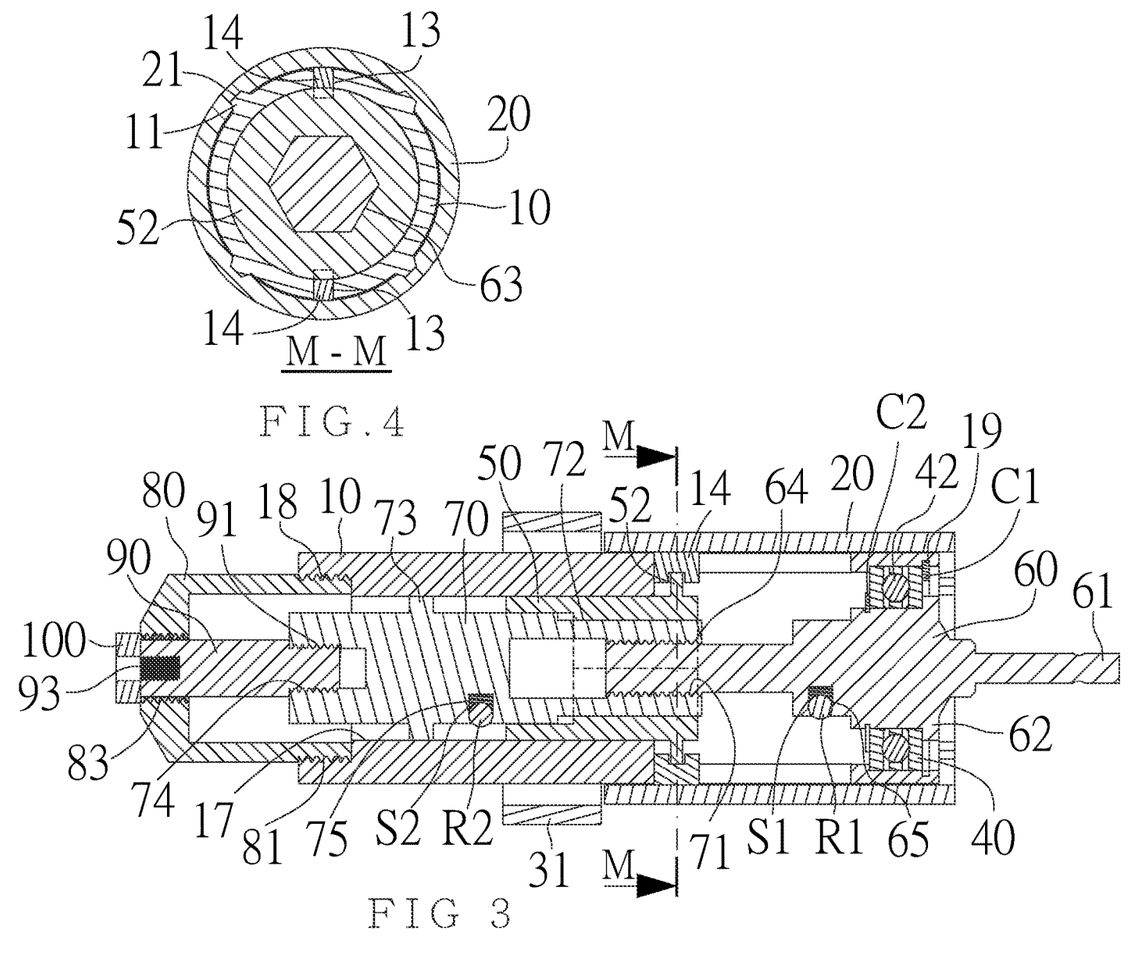
FIG. 3 is a cross sectional view showing the assembly of the installation tool for the self-tapping rivet fastener according to the preferred embodiment of the present invention.
FIG. 4 is a cross sectional view taken along the lint M-M of FIG. 3.
Figure 5:
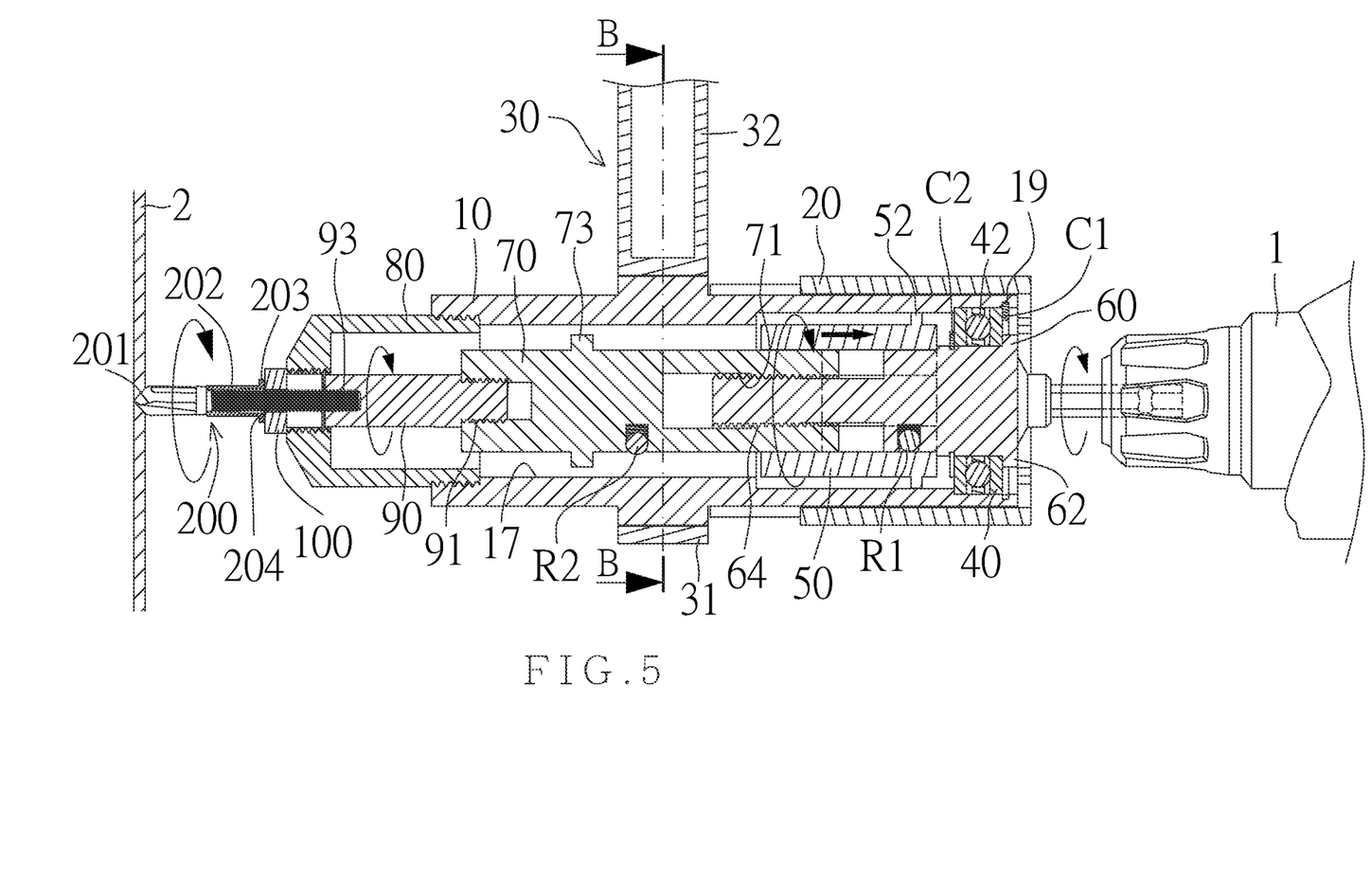
FIG. 5 is a cross sectional view showing the application of the installation tool for the self-tapping rivet fastener according to the preferred embodiment of the present invention.

FIG. 1 is a perspective view showing the assembly of an installation tool for a self-tapping rivet fastener according to a preferred embodiment of the present invention. FIG. 2 is a perspective view showing the exploded components of the installation tool for the self-tapping rivet fastener according to the preferred embodiment of the present invention. FIG. 3 is a cross sectional view showing the assembly of the installation tool for the self-tapping rivet fastener according to the preferred embodiment of the present invention. FIG. 4 is a cross sectional view taken along the lint M-M of FIG. 3. FIG. 5 is a cross sectional view showing the application of the installation tool for the self-tapping rivet fastener according to the preferred embodiment of the present invention.

With reference to FIGS. 1-5, the installation tool for the self-tapping rivet fastener according to the preferred embodiment of the present invention comprises: a body 10, a movable sleeve 20, a handle 30, a single-direction thrust bearing 40, a switcher 50, a drive rod 60, a transmission shaft 70, a cap 80, a locking element 90, and a screw nut 100.

The body 10 includes multiple ribs 11 equidistantly formed on an outer wall thereof and configured to slidably fit with the movable sleeve 20, two protrusions 12 formed on two ribs 11 of the multiple ribs 11 and configured to engage with the movable sleeve 20, two slots 13 defined between the two ribs 11 and configured to receive two slide blocks 14, a circular orifice 15 defined on an inner wall of the body 10 and corresponding to the movable sleeve 20, a stepped fringe 16 formed in the circular orifice 15 and configured to accommodate the single-direction thrust bearing 40, a positioning orifice 17 formed in a hexagon shape and defined in the body 10 opposite to the circular orifice 15, a threaded section 18 formed in an and of the body 10, connected with the positioning orifice 17 and screwed with the cap 80, and a connection groove 19 defined on the other end of the body 10 and configured to engage with a C-shaped retainer C1, wherein a respective one slide block 14 has a notch 141 corresponding to the circular orifice 15 and configured to connect with the switcher 15.

An inner diameter of the movable sleeve 20 is equal to an outer diameter of the body 10, and the movable sleeve 20 includes multiple recesses 21 defined on an inner wall thereof and corresponding to the multiple ribs 11 of the body 10 so that the movable sleeve 20 is fitted with and moves forward and backward on the outer wall of the body 10 by slidably fitting the multiple recesses 21 with the multiple ribs 11. The movable sleeve 20 further includes two trenches 22 corresponding to and engaged with the two protrusions 12 of the body 10 so as to connect the movable sleeve 20 with the body 10.

The handle 30 includes a hollowly circular fitting portion 31, wherein an inner diameter of the fitting portion 31 is equal to an outer diameter of the two protrusions 12 so that the fitting portion 31 of the handle 30 is fitted with the two protrusions 12 of the body 10, thus connecting the handle 30 with the body 10. The fitting portion 31 has a grip extension 32 extending outward therefrom and configured to be held by a user.

The single-direction thrust bearing 40 includes a central orifice 41 configured to rotatably connect with the drive rod 60, wherein an outer diameter of the single-direction thrust bearing 40 is equal to an inner diameter of the circular orifice 15 of the body 10. The single-direction thrust bearing 40 is fixed on the stepped fringe 16, and the single-direction thrust bearing 40 includes multiple rolling balls 42 arranged on an outer wall thereof and configured to actuate the drive rod 60 to thrust in a single direction.

The switcher 50 includes a hexagonal coupling portion 51 corresponding to the positioning orifice 17 of the body 10, a connection flange 52 corresponding to and engaged with the notch 141 of the respective one slide block 14 so that the respective one slide block 14 actuates the switcher 50 to move forward and backward, the hexagonal coupling portion 51 of the switcher 50 removes from or connects with the positioning orifice 17 of the body 10, thus switching to drill and rivet a workpiece. The switcher 50 includes a hexagonal defining hole 53 defined on an end thereof, corresponding to the movable sleeve 20, and configured to fit with the drive rod 60. The switcher 50 further includes a circular fitting hole 54 defined on the other end thereof and configured to fit with the transmission shaft 70.

The drive rod 60 includes a hexagonal shank 61 extending from an end thereof and configured to fit with an electric driving tool 1, the drive rod 60 includes a positioning fringe 62 formed adjacent to the hexagonal shank 61 and corresponding to the single-direction thrust bearing 40, wherein the drive rod 60 is rotatably fitted in the central orifice 41 of the single-direction thrust bearing 40, and the positioning fringe 62 is mounted on the outer wall of the single-direction thrust bearing 40. The drive rod 60 further includes a hexagonal fixing portion 63 formed on the other end thereof and corresponding to and connected with the hexagonal defining hole 53 of the switcher 50 so that the hexagonal defining hole 53 of the switcher 50 connects with or removes from the hexagonal fixing portion 63 of the drive rod 60, thus switching to drill a drilled hole and rivet a nut of the workpiece. The drive rod 60 includes threads 64 corresponding to and screwed with the transmission shaft 70, a first radial orifice 65 defined on the hexagonal fixing portion 63 and configured to fit with a first locating spring S1 and a first steel ball R1 which is received in the hexagonal defining hole 53 of the switcher 50. The drive rod 60 further includes a locking groove 66 connected with the hexagonal fixing portion 63 and configured to engage with a C-shaped retainer C2.

The transmission shaft 70 includes a threaded orifice 71 defined on a center thereof and corresponding to and screwed with the threads 64 of the drive rod 60, the transmission shaft 70 includes a hexagonal connecting portion 72 formed on an end thereof and corresponding to and connected with the hexagonal defining hole 53 of the switcher 50 so that the hexagonal defining hole 53 of the switcher 50 connects with or removes from the hexagonal fixing portion 63 of the drive rod 60, thus switching to drill and rivet the workpiece. The transmission shaft 70 further includes a shoulder 73 extending from an outer wall thereof, a screwing orifice 74 formed on the other end of the transmission shaft 70 and corresponding to and screwed with the locking element 90, a second radial orifice 75 configured to fit with a second locating spring S2 and a second steel ball R2 which is received in the hexagonal defining hole 53 of the switcher 50.

The cap 80 is hollow, and the cap 80 includes an external threaded portion 81 formed on an end thereof and corresponding to and screwed with the threaded section 18 of the body 10, an axial orifice 82 defined in the cap 80, and a screwing orifice 83 formed on the other end of the cap 80, corresponding to the locking element 90 and screwed with the screw nut 100.

The locking element 90 includes a threaded extension 91 formed on an end thereof and corresponding to the screwing orifice 74 of the transmission shaft 70, a hexagonal driving portion 92 corresponding to the threaded extension 91 and configured to screw the threaded extension 91 with the screwing orifice 74, and a threaded aperture 93 formed on the other end of the locking element 90 and configured to screw with the self-tapping threads 204.

The screw nut 100 includes a screwing section 101 formed on an end thereof, corresponding to and screwed with the screwing orifice 83 of the cap 80, wherein the screw nut 100 includes a hexagonal head configured to screw the screwing section 101 of the screw nut 100 with the screwing orifice 83 of the cap 80, and the screw nut 100 includes a receiving orifice 102 defined in a center thereof so that the threaded aperture 93 of the locking element 90 extends out of the receiving orifice 102.

The self-tapping rivet 200 includes a drilling cutter 201 extending from an end thereof, a deformable portion 202 extending from an end of the drilling cutter 201, a stop flange 203 extending from a rear end of the deformable portion 202, and the self-tapping threads 204 formed on the other end of the drilling cutter 201, wherein an end of the self-tapping threads 204 opposite to the drilling cutter 201 is screwed with the threaded aperture 93 of the locking element 90.

Figure 6:
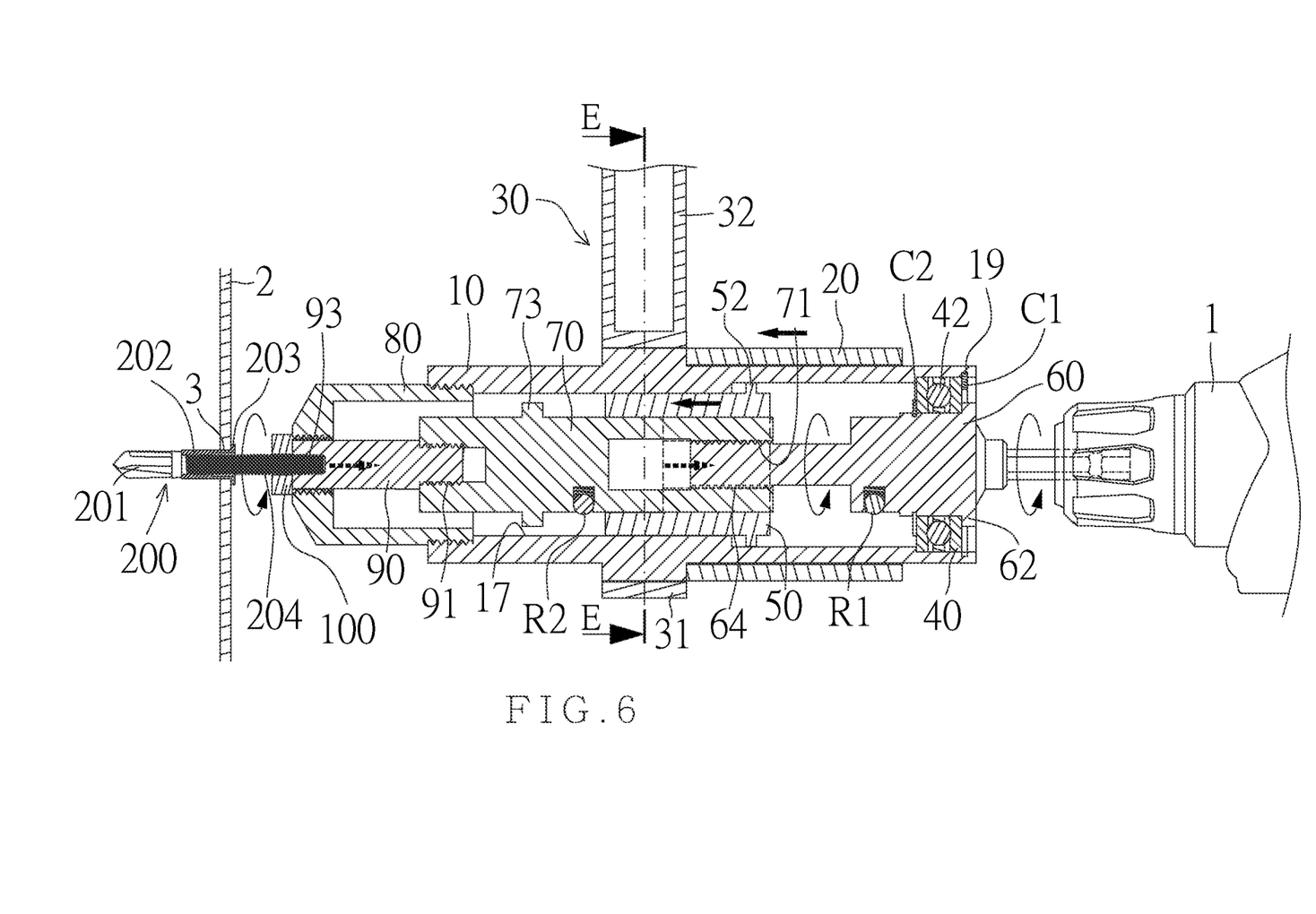
FIG. 6 is a cross sectional view showing the application of the installation tool according to the preferred embodiment of the present invention.
Figure 8:
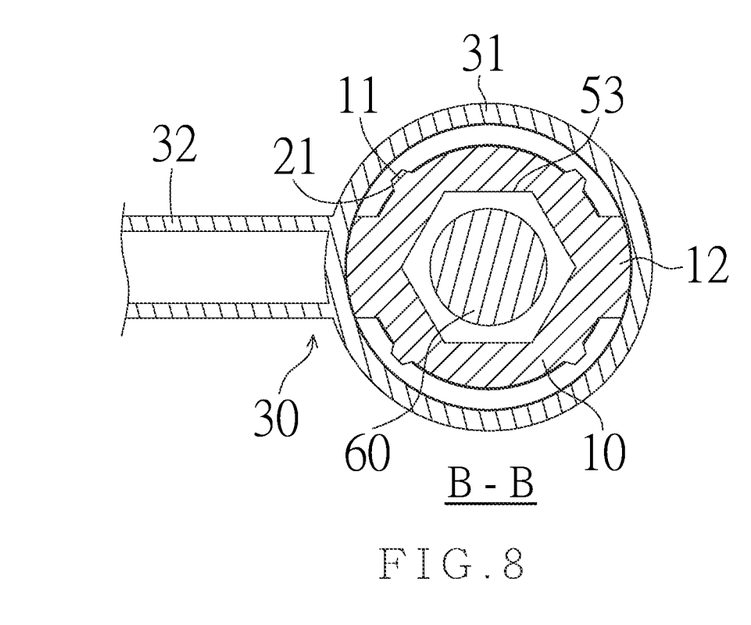
FIG. 8 is a cross sectional view taken along the line B-B of FIG. 5.

FIG. 6 is a cross sectional view showing the application of the installation tool according to the preferred embodiment of the present invention. FIG. 8 is a cross sectional view taken along the line B-B of FIG. 5. In operation, the movable sleeve 20 actuates the two slide blocks 14 and the switcher 50 to move rearward so that the circular fitting hole 54 of the switcher 50 removes from the positioning orifice 17 of the body 10, and the hexagonal defining hole 53 and the hexagonal fixing portion 63 are connected with the hexagonal connecting portion 72, hence the switcher 50 and the transmission shaft 70 are driven by the drive rod 60 to rotate simultaneously to drill the workpiece (such as a plate 2), and the drilling cutter 201 of the self-tapping rivet 200 is tapped into the plate 2 to drill the drilled hole 3.

Figure 7:
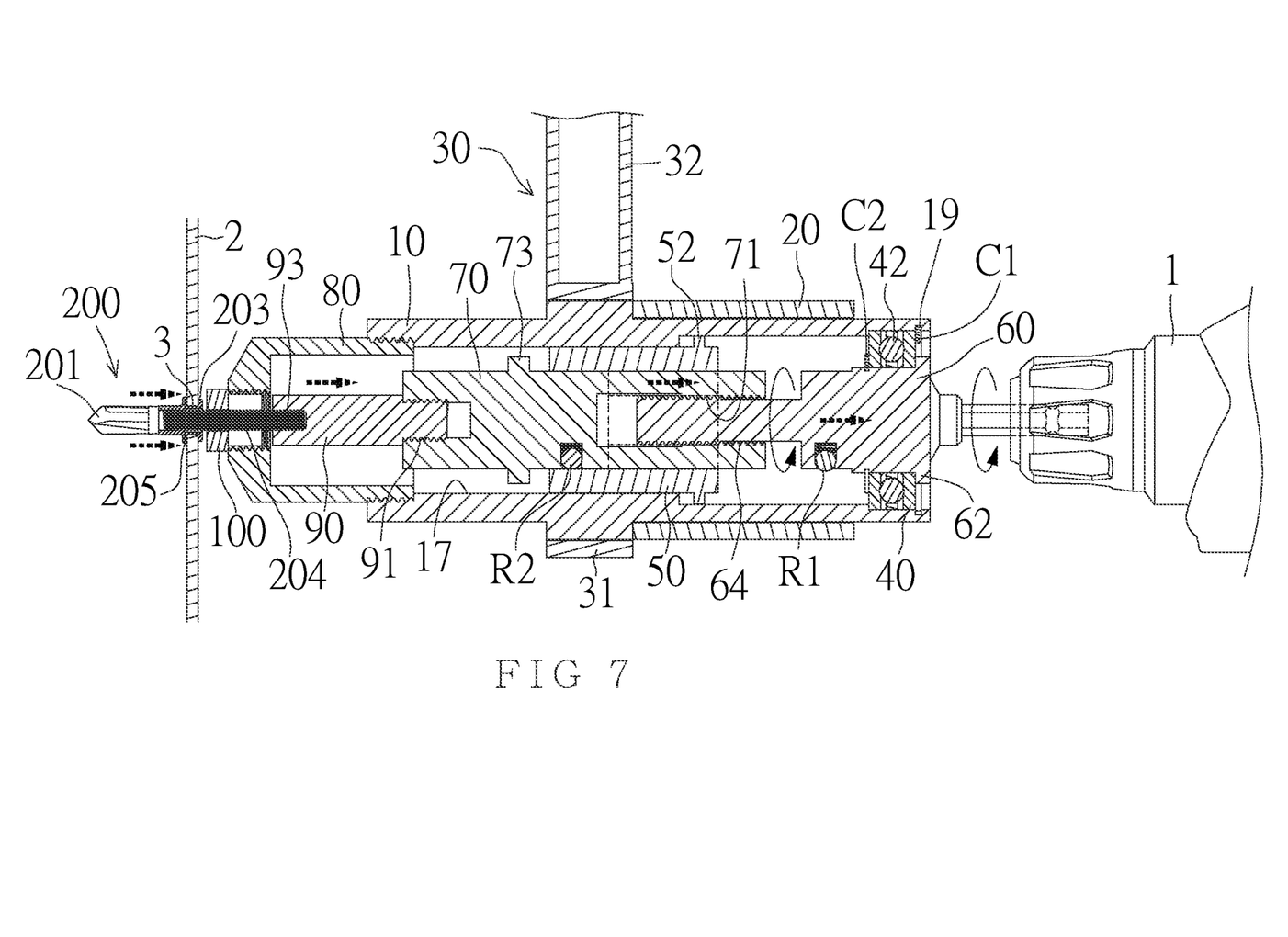
FIG. 7 is a cross sectional view showing another application of the installation tool according to the preferred embodiment of the present invention.
Figure 9:
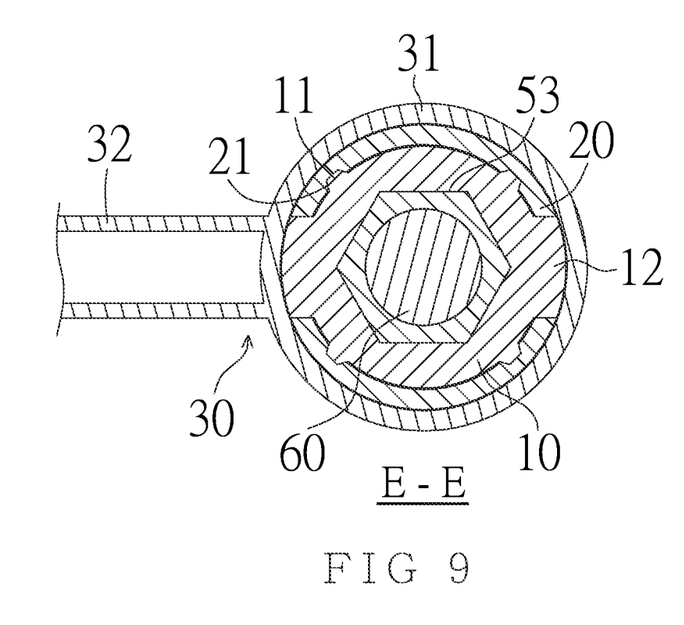
FIG. 9 is a cross sectional view taken along the line E-E of FIG. 6.

FIG. 7 is a cross sectional view showing another application of the installation tool according to the preferred embodiment of the present invention. FIG. 9 is a cross sectional view taken along the line E-E of FIG. 6. After drilling the drilled hole, the movable sleeve 20 actuates the two slide blocks 14 and the switcher 50 to move forward so that the circular fitting hole 54 of the switcher 50 connects with the positioning orifice 17 of the body 10, and the switcher 50 and the transmission shaft 70 do not rotate with the hexagonal fixing portion 63, hence the drive rod 60 is screwed to actuate the transmission shaft 70 and the locking element 90 to pull the self-tapping threads 204 rearward for riveting, and the deformable portion 202 of the self-tapping rivet 200 is pressed to deformably form an enlarged flange 205 so that the enlarged flange 205 and the stop flange 203 engage with the drilled hole 3 of the plate 2, thus obtaining quick drilling and riveting operation.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An installation tool for a self-tapping rivet fastener comprising: a body, a movable sleeve, a handle, a single-direction thrust bearing, a switcher, a drive rod, a transmission shaft, a cap, a locking element, and a screw nut; wherein the body includes multiple ribs equidistantly formed on an outer wall thereof and configured to slidably fit with the movable sleeve, two protrusions formed on two ribs of the multiple ribs and configured to engage with the movable sleeve, two slots defined between the two ribs and configured to receive two slide blocks, a circular orifice defined on an inner wall of the body and corresponding to the movable sleeve, a stepped fringe formed in the circular orifice and configured to accommodate the single-direction thrust bearing, a positioning orifice defined in the body opposite to the circular orifice, a threaded section formed in an and of the body, connected with the positioning orifice and screwed with the cap, and a connection groove defined on the other end of the body and configured to engage with a C-shaped retainer, wherein a respective one slide block has a notch corresponding to the circular orifice and connect with the switcher;

an inner diameter of the movable sleeve is equal to an outer diameter of the body, and the movable sleeve moves forward and backward on the outer wall of the body;

the handle includes a hollowly circular fitting portion configured to fit with the body, and the fitting portion has a grip extension extending outward therefrom;

the switcher includes a coupling portion corresponding to the positioning orifice of the body, a connection flange corresponding to and engaged with the notch of the respective one slide block so that the respective one slide block actuates the switcher to move forward and backward, the coupling portion of the switcher removes from or connects with the positioning orifice of the body, thus switching to drill and rivet a workpiece; wherein the switcher includes a defining hole defined on an end thereof, corresponding to the movable sleeve, and configured to fit with the drive rod; and the switcher further includes a fitting hole defined on the other end thereof and configured to fit with the transmission shaft;

the drive rod includes a shank extending from an end thereof and configured to fit with an electric driving tool, the drive rod includes a positioning fringe formed adjacent to the shank and corresponding to the single-direction thrust bearing, wherein the shank of the drive rod is rotatably fitted in the central orifice of the single-direction thrust bearing, and the positioning fringe is mounted on the outer wall of the single-direction thrust bearing; the drive rod further includes a fixing portion formed on the other end thereof and corresponding to and connected with the defining hole of the switcher so that the defining hole of the switcher connects with or removes from the fixing portion of the drive rod, thus switching to drill a drilled hole and rivet a nut of the workpiece; the drive rod includes threads corresponding to and screwed with the transmission shaft, a first radial orifice defined on the fixing portion and configured to fit with a first locating spring and a first steel ball which is received in the defining hole of the switcher; and the drive rod further includes a locking groove connected with the fixing portion and configured to engage with a C-shaped retainer;

the transmission shaft includes a threaded orifice defined on a center thereof and corresponding to and screwed with the threads of the drive rod, the transmission shaft includes a connecting portion formed on an end thereof and corresponding to and connected with the defining hole of the switcher so that the defining hole of the switcher connects with or removes from the fixing portion of the drive rod, thus switching to drill and rivet the workpiece; the transmission shaft further includes a shoulder extending from an outer wall thereof, a screwing orifice formed on the other end of the transmission shaft and corresponding to and screwed with the locking element, a second radial orifice configured to fit with a second locating spring and a second steel ball which is received in the defining hole of the switcher;

the cap is hollow, and the cap includes an external threaded portion formed on an end thereof and corresponding to and screwed with the threaded section of the body, and a screwing orifice formed on the other end of the cap, corresponding to the locking element and screwed with the screw nut;

the locking element includes a threaded extension formed on an end thereof and corresponding to the screwing orifice of the transmission shaft, a driving portion corresponding to the threaded extension and configured to screw the threaded extension with the screwing orifice, and a threaded aperture formed on the other end of the locking element; and the screw nut includes a screwing section formed on an end thereof, corresponding to and screwed with the screwing orifice of the cap, and the screw nut includes a receiving orifice defined in a center thereof so that the threaded aperture of the locking element extends out of the receiving orifice.

2. The installation tool as claimed in claim 1, wherein the positioning orifice of the body is formed in a hexagon shape to correspond to the coupling portion of the switcher which is hexagonal.

3. The installation tool as claimed in claim 1, wherein the defining hole of the switcher is hexagonal to correspond to the fixing portion of the drive rod which is hexagonal.

4. The installation tool as claimed in claim 1, wherein the defining hole of the switcher is hexagonal to correspond to the connecting portion of the transmission shaft which is hexagonal.

5. The installation tool as claimed in claim 1, wherein the shank of the drive rod is hexagonal.

6. The installation tool as claimed in claim 1, wherein the driving portion of the locking element is hexagonal.

* * * * *